US006476843B2

(12) United States Patent
Kerr

(10) Patent No.: US 6,476,843 B2
(45) Date of Patent: Nov. 5, 2002

(54) REINFORCED SHEET METAL FRAME INCORPORATING PRINT ENGINE CHASSIS

(75) Inventor: Roger S. Kerr, Brockport, NY (US)

(73) Assignee: Eastman Kodak Company, Rochester, NY (US)

(*) Notice: Subject to any disclaimer, the term of this patent is extended or adjusted under 35 U.S.C. 154(b) by 69 days.

This patent is subject to a terminal disclaimer.

(21) Appl. No.: 09/750,953

(22) Filed: Dec. 28, 2000

(65) Prior Publication Data

US 2002/0126198 A1 Sep. 12, 2002

(51) Int. Cl.[7] ................................................ G01D 15/10
(52) U.S. Cl. ........................................................ 347/222
(58) Field of Search ................................. 347/220, 222, 347/245, 263, 108; 400/691, 693, 689, 690, 694

(56) References Cited

U.S. PATENT DOCUMENTS

| | | | | |
|---|---|---|---|---|
| 4,088,214 A | * | 5/1978 | Shindo et al. | 347/220 |
| 4,550,798 A | * | 11/1985 | Swartz et al. | 181/201 |
| 5,110,283 A | | 5/1992 | Bluml et al. | |
| 5,144,461 A | * | 9/1992 | Horan | 359/30 |
| 5,268,708 A | | 12/1993 | Harshbarger et al. | |
| 5,415,610 A | | 5/1995 | Schutz et al. | |
| 5,678,291 A | | 10/1997 | Braun | |
| 5,765,818 A | | 6/1998 | Sabatino et al. | |
| 6,203,224 B1 | * | 3/2001 | Kerr | 400/691 |

* cited by examiner

*Primary Examiner*—John Barlow
*Assistant Examiner*—K. Feggins
(74) *Attorney, Agent, or Firm*—Arthur I. Navarro; Nelson Adrian Blish

(57) ABSTRACT

A printer frame (12) comprising a sheet metal skeleton structure (14) encasing a filler material (54) of castable polymer. The frame (12) is fabricated by joining sheet metal members using slot-and-slot or slot-and-tab junctions to form a sheet metal skeleton. A filler material (54) substance is then applied strategically to cavities (16) and troughs (18) created when the interlocking members are joined. When the filler material (54) hardens, the resulting printer frame (12) provides structural support with improved vibration damping.

27 Claims, 6 Drawing Sheets

REINFORCED SHEET METAL FRAME INCORPORATING PRINT ENGINE CHASSIS

FIELD OF THE INVENTION

This invention generally relates to printer apparatus and methods of manufacture and more particularly relates to a print engine frame incorporating the print engine chassis and fabricated using sheet metal reinforced with castable polymer concrete.

BACKGROUND OF THE INVENTION

Pre-press color proofing is a procedure used by the printing industry for creating representative images of printed material. This procedure avoids the high cost and time required to produce printing plates and also avoids setting-up a high-speed, high-volume printing press to produce a representative sample, as a proof, of an intended image to be printed. Otherwise, in the absence of pre-press proofing, a production run may require several corrections and be reproduced several times to satisfy customer requirements. This results in lost time and profits. By utilizing pre-press color proofing, time and money are saved.

A laser thermal printer having half-tone color proofing capabilities is disclosed in commonly assigned U.S. Pat. No. 5,268,708 titled "Laser Thermal Printer With An Automatic Material Supply" issued Dec. 7, 1993 in the name of R. Jack Harshbarger, et al. (Harshbarger, et al.) The Harshbarger, et al. device is capable of forming an image on a sheet of thermal print media by transferring dye from a roll of dye donor material to the thermal print media. This is achieved by applying a sufficient amount of thermal energy to the dye donor material to form the image on the thermal print media. This apparatus generally comprises a material supply assembly, a lathe bed scanning subsystem (which includes a lathe bed scanning frame, a translation drive, a translation stage member, a laser printhead, and a rotatable vacuum imaging drum), and exit transports for exit of thermal print media and dye donor material from the printer.

Although the printer disclosed in the Harshbarger, et al. patent performs well, it would be advantageous to reduce manufacturing costs for this type of printer and for similar types of imaging apparatus. In addition, reducing the overall size of such a printer would have advantages in minimizing floor-space requirements for customers. In the printer disclosed in the Harshbarger, et al. patent, a machine casting is used for the print engine chassis and this chassis, in turn, is mounted atop a metal frame. The metal frame is typically welded together and requires substantial strength to support the print engine and its writing components. Vibration compensation is required to isolate any vibration from equipment in the frame, such as fans and vacuum equipment, from interfering with the precision printhead and its translation apparatus. Rubber mountings are required between print engine chassis and frame.

The machined casting used as the frame represents significant cost relative to the overall cost of the printer. Cost factors include the design and fabrication of the molds, the casting operation, and subsequent machining needed in order to achieve the precision necessary for a lathe bed scanning engine used in a printer of this type. Castings present inherent problems in modeling, making it difficult to use tools such as finite element analysis to predict the suitability of a design. Moreover, due to shrinkage, porosity, and other manufacturing anomalies, it is difficult to obtain uniform results when casting multiple frames. In the assembly operation, each frame casting must be individually assessed for its suitability to manufacturing standards and must be individually machined. Further, castings also exhibit frequency response behavior, such as to resonant frequencies, which are difficult to analyze or predict. For this reason, the task of identifying and reducing vibration effects can require considerable work and experimentation. Additionally, the overall amount of time required between completion of a design and delivery of a prototype casting can be several weeks or months.

The combined weight of the imaging drum, motor and encoder components, and print head translation assembly components, plus the inertial forces applied when starting and stopping the drum require a frame having substantial structural strength. For this reason, a sheet metal frame, by itself, would not be considered to provide a solution.

Alternative methods used for frame fabrication have been tried, with some success. For example, welded frame structures have been used. However, these welded structures require significant expense in manufacture.

Alternatives to metal castings and welded structures have been used by manufacturers of machine tools. In particular, castable polymers, manufactured under a number of trade names, have been employed to provide support structures that are at least equivalent to castings for apparatus such as machine tool beds and optical tables. These castable polymers also provide improved performance when compared with castings, with respect to expansion/contraction due to heat and with respect to vibration damping.

To provide substitute structures for metal castings and weldments, one example of the use of a castable polymer is disclosed in U.S. Pat. No. 5,415,610 (Schutz et al.). Schutz et al. discloses a frame for machine tools using castable concrete to form a single casting of a bed and a vertical wall for a machine tool. U.S. Pat. No. 5,678,291 (Braun) and 5,110,283 (Blumi et al.) are further examples in which a castable polymer concrete is used as a machine tool bed or for mounting guide rails in machining environments. Castable polymers are also used in the machine tool environment for damping mechanisms, as is disclosed in U.S. Pat. No. 5,765,818 (Sabatino et al.) These machine tool applications use castable polymer concrete as a high-mass bed for tool support and vibration damping.

There has been a long-felt need to reduce the cost and complexity of printer fabrication without compromising the structural strength required for the frame and lathe bed scanning assembly. However, up to this time, printer solutions have been limited to the use of conventional castings or weldments. As such, a printer frame overcoming the disadvantages of cast or welded frames would provide numerous advantages.

SUMMARY OF THE INVENTION

An object of the present invention is to provide a reinforced sheet metal body that combines the print engine chassis and machine frame into a single, rigid structure. The goal is to provide a frame that is also economical and easy to manufacture.

With the above object in view, the present invention provides a printer frame for supporting an imaging drum, a printhead translation assembly, media supply components, and supporting power supply, control logic, and vacuum components. The frame comprises a skeleton structure of interlocking rigid sheet metal members and a filler material poured into the skeleton structure to provide rigidity at points where the rigid sheet metal members interlock.

According to one embodiment of the present invention, sheet metal pieces are cut to form the interlocking rigid members, having tabs and slots that allow the interlocking rigid members to be quickly assembled by hand in order to form the skeletal structure of the printer frame. Then, a filler material, preferably of castable polymer concrete, is poured into selective cavities formed within the skeletal structure formed by the sheet metal members.

According to another embodiment of the present invention, a sheet metal printer frame for supporting an imaging drum, a printhead translation assembly, and media supply components is disclosed. The printer frame comprises a base with two walls extending from the base. The walls have cavities to accept a filler material. After the filler material is poured into the cavities, the filler material hardens to form a rigid printer frame capable of supporting the imaging drum, printhead translation assembly and the media supply components.

Also disclosed is a method for fabricating a frame for a print engine. The method comprises the step of coupling first and second sheet metal members. Next a filler material is poured over specific junctions of the sheet metal members. When the filler material hardens it firmly locks the sheet metal members together in a rigid joint.

An advantage of the present invention is that individual interlocking rigid sheet metal members can be modified in order to change the design of the printer frame, even to modify the size or configuration of the overall frame structure. This contrasts with methods using a casting, which cannot be easily modified or scaled dimensionally. This advantage is particularly beneficial when there is a need to adjust the frequency response of a structure to compensate for vibration effects, for example.

Another advantage of the present invention is that an individual interlocking rigid member can be fabricated to allow its use with a number of different printer configurations. By providing alternate slot and tab features on a rigid member, a designer can allow its use in a number of different ways, as assembled. This results in potential cost savings, cutting down the number of parts that would be needed to support multiple printer configurations.

Another advantage of the present invention is that a castable filler can be selected having optimal properties for adhesion, structural strength, and vibration damping, as well as thermal expansion characteristics closely matched to those of the surrounding metal structure.

Yet another advantage of the present invention over welded frames is the elimination of dip or chemical finishing of a large frame, as is needed following welding. An unwanted after-effect of dipping is trapping of residual fluid in the frame structure, particularly unsuitable for precision devices such as the imaging system of the present invention.

A further advantage of the present invention is that parts can be fixed in place and added to a printer frame during assembly, at the time the castable polymer filling is applied. This reduces costs over machining and allows changes to be easily incorporated into the design.

An additional advantage of the present invention is provided by the use of magnets in place of standard hardware. This allows assembly of a frame without tools.

These and other objects, features and advantages of the present invention will become apparent to those skilled in the art upon a reading of the following detailed description when taken in conjunction with the drawings.

BRIEF DESCRIPTION OF THE DRAWINGS

For a more complete understanding of the present invention, including its features and advantages, reference is made to the following detailed description of the invention, taken in conjunction with the accompanying drawings in which.

Corresponding numerals and symbols in these figures refer to corresponding parts in the detailed description unless otherwise indicated.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. These specific embodiments discussed herein are merely illustrative of specific ways to make and use the invention, and do not delimit the scope or application of the invention.

Figure 1:
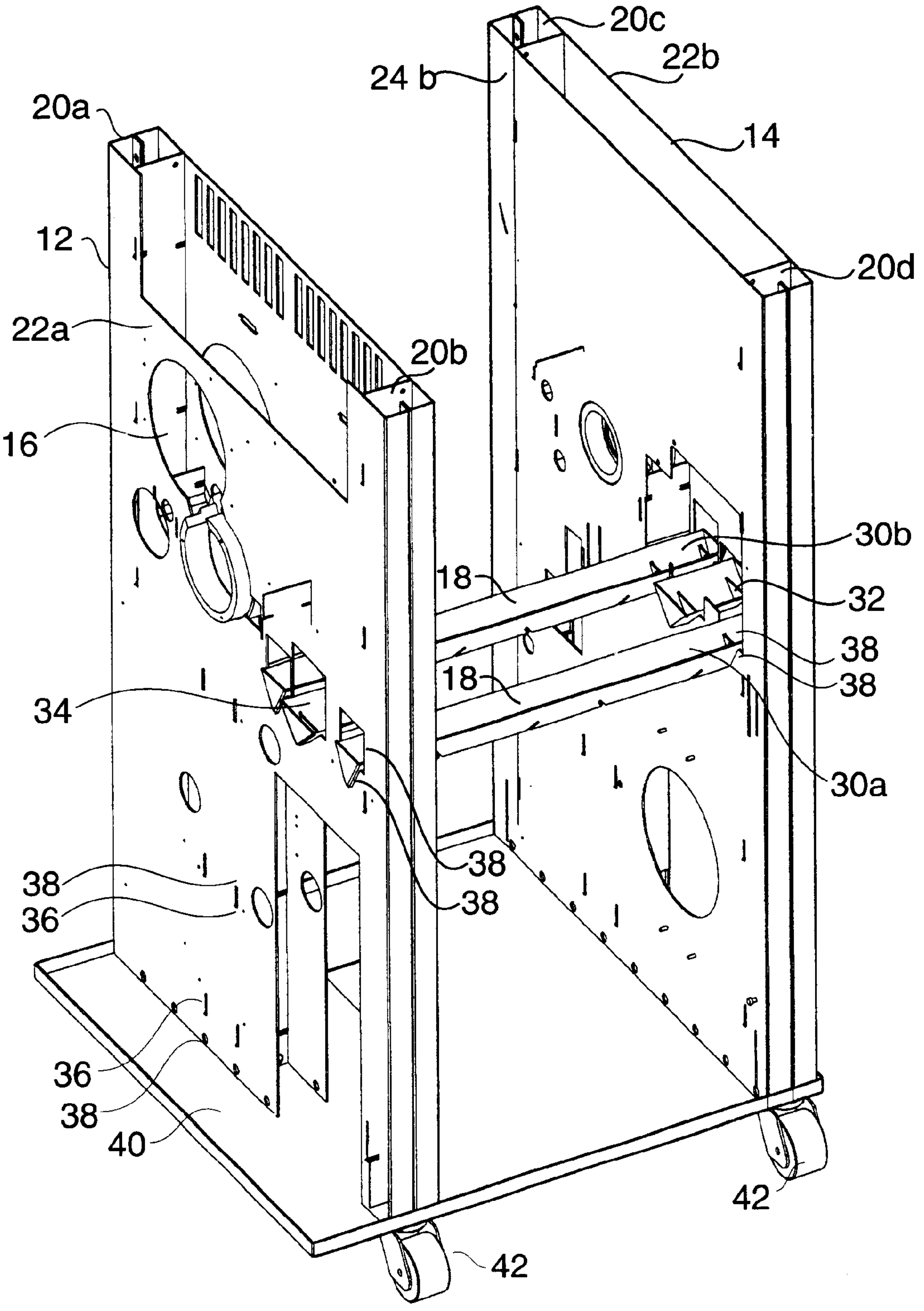
FIG. 1 is an illustration of a skeletal sheet metal printer frame structure in the preferred embodiment of this invention.

Referring to FIG. 1, therein is shown a sheet metal printer frame 12 formed from a skeleton structure 14. In the preferred embodiment, skeleton structure 14 is composed of sheet steel of 0.090-inch thickness (nominal). The sheet steel is used to provide sufficient strength for printer frame 12. Sheet steel members are stamped or cut from stock using laser cutting techniques, then provided with a finished surface, as is well known in the sheet metal arts.

Sheet metal printer frame 12 comprises a base 40, having wheels 42. The preferred wheel 42 is a castering wheel, as is well known to those skilled in the art. Sheet metal printer frame 12 further comprises sidewalls **22*a* and 22*b* and inner walls 24*a* and 24*b*. Inner walls 24*a* and 24*b* have side cavities 20*a*, 20*b*, 20*c*, 20*d*, respectively, created from folds in the sheet metal. Sheet metal printer frame 12 further comprises supporting and bracing structures provided by full-length cross-struts 30*a* and 30*b*. A left cross-strut 34 spans between sidewall 22*a* and inner wall 24*a*. A right cross-strut 32 spans between sidewall 22*b* and inner wall 24*b*. Each of these struts 30*a*, 30*b*, 32, 34, respectively, form a trough 18 which will be filled with a filler material to hold the respectively struts 30*a*, 30*b*, 32, 34** in place and to provide additional strength.

Referring again to FIG. 1, slot 38 in inner wall **24*b* is shown joining with a slot 38 in full length cross strut 30*a*. Sheet metal structures that form sheet metal printer frame 12 are joined without fasteners, using a suitable combination of slot-and-slot or slot-and-tab construction. In this arrangement, slot 38 mates with a corresponding slot 38** on a joining member.

Some sheet metal members have a tab 36 placed through a slot 38 in another sheet metal member. Specifically, slot-and-tab construction is a useful technique for joining structural members to form a skeleton structure 14 for a sheet metal printer frame 12.

Using an arrangement of sheet metal members, configured as is shown in FIG. 1, it can be seen that a design can be implemented that allows reuse of the same members for different printer frame configurations. For example, inner wall 24*a* could be disposed further to the left within sheet metal printer frame 12. This might be preferable, for example, where the weight of supported motor structures requires additional support. With additional slots 38 cut into cross-struts 30*a* and 30*b*, and inner wall 24*a*, the components supported by inner wall 24*a* could be suitably repositioned in a number of different locations. Alternately, the overall dimensions of sheet metal printer frame 12 could be altered while using many of the same sheet metal members. For example, the width of sheet metal printer frame 12 could be changed by altering the lengths of full-length cross struts 30*a* and 30*b*.

Figure 2:
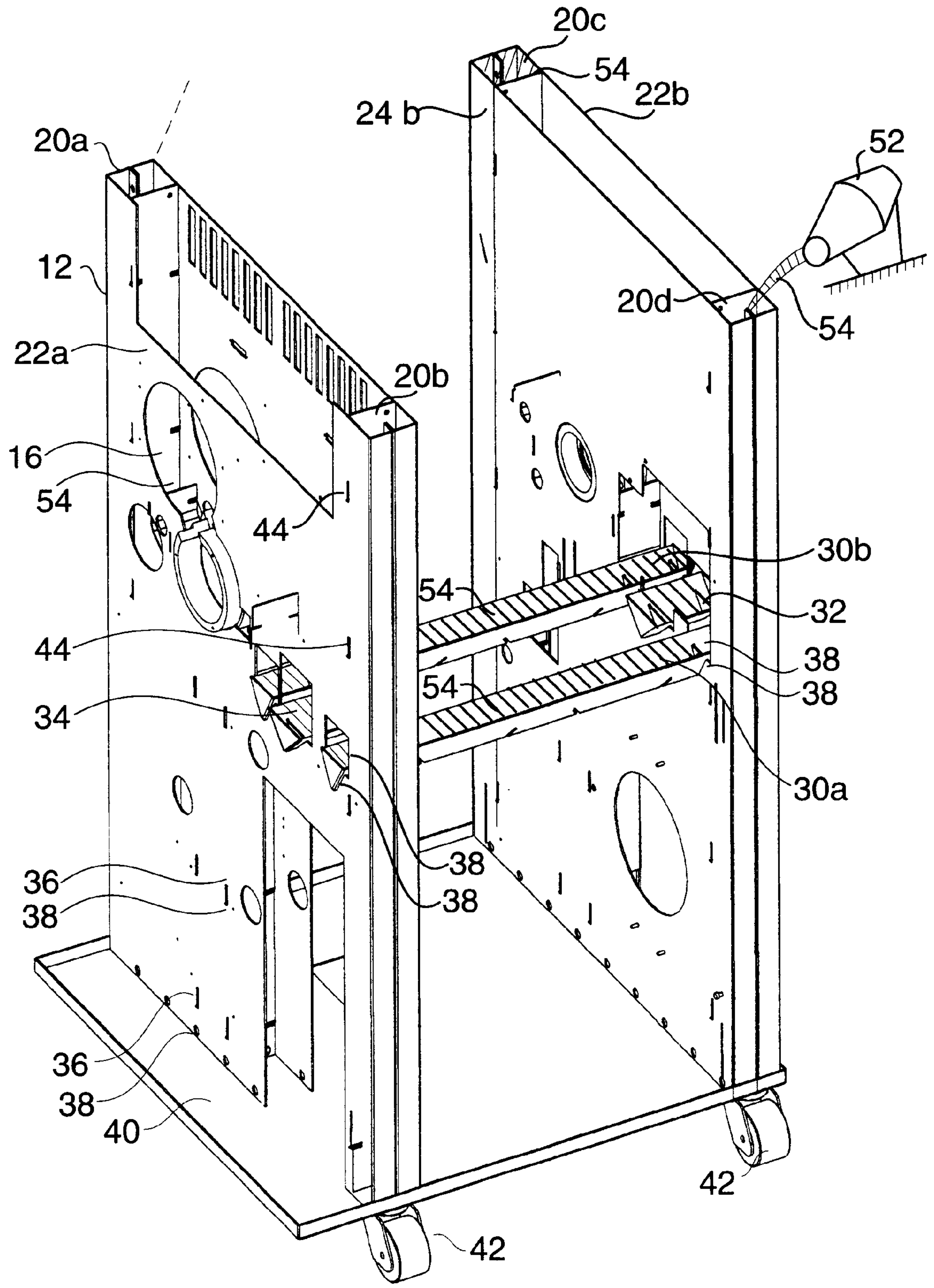
FIG. 2 is an illustration of a skeletal sheet metal printer frame structure of FIG. 1 filled with a filler material.

FIG. 2 illustrates sheet metal printer frame 12 reinforced using a filler material 54 applied into selective portions such as side cavity 20*d*. Structures which accept filler material 54 include the following:

Side cavities 20*a*, 20*b*, 20*c*, 20*d;*

Cavities 16;

Full-length cross-struts 30*a*, 30*b;*

Left cross-strut 34;

Right cross-strut 32; and

Base 40.

Once applied into these structures, filler material 54 hardens and locks sheet metal members of sheet metal printer frame 12 rigidly into place. Filler material 54 is mixed in mixer 52 and poured in to the cavities 16, 20*a*, 20*b*, 20*c*, and 20*d* and troughs 18. The application of the filler material 54 may be accomplished by pouring, shoveling, troweling, spraying, injecting, or other similar processes known in the art.

Filler material 54 is preferably a castable polymer concrete, such as "SUPER ALLOY" Polymer Concrete manufactured by Philadelphia Resins, located in Montgomeryville, Pa. Castable polymer substances such as the "SUPER ALLOY" mixture provide a stable structure for the print engine chassis. For printer frame applications, castable polymer concrete is particularly well suited, since this substance provides excellent vibration damping. Moreover, since aggregate size can be changed, castable polymer concrete can be modified to optimize vibration response characteristics for specific equipment applications. Significantly, the coefficient of thermal expansion for castable polymer concrete is very close to the coefficient of thermal expansion for sheet metal. This allows for thermal expansion at nearly the same rate as the sheet steel. Thus, the sheet steel and the castable polymer concrete combine to provide a particularly rigid structure for sheet metal printer frame 12.

Figure 3:
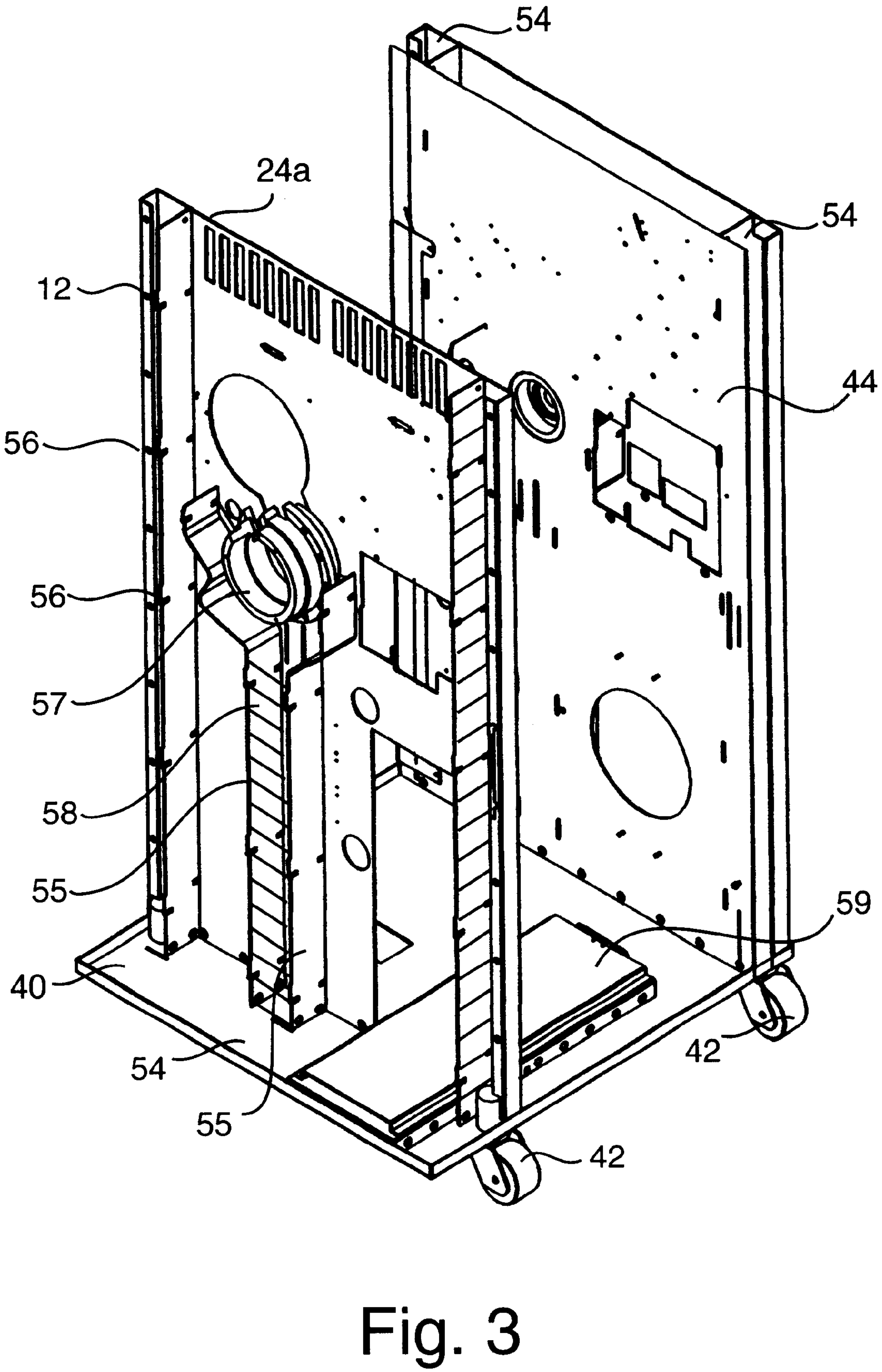
FIG. 3 is a view in perspective of a skeletal sheet metal printer frame structure, with one side panel removed for visibility of components through a side wall.

FIG. 3 shows how sheet metal printer frame 12 is adapted for support of components that present weight or stress on sheet metal printer frame 12. In particular, sheet metal printer frame 12 must support the mass and inertial stresses of an imaging drum 74 (shown in position in FIG. 4). In FIG. 3, sidewall 22*a* is removed for visibility of components inside this wall of sheet metal printer frame 12.

In addition, FIG. 3 also shows how inner wall 24*a* is constructed. Magnets 56 are mounted along the edge of side wall 22*a*. Magnets 56 then hold sidewall 22*a* (shown in FIGS. 1 and 2) in place until castable filler material 54 hardens. The use of magnets 56, affixed to inner wall 22*a*, thereby eliminates the need to use standard fasteners, allowing the assembly of sheet metal printer frame 12 without tools.

In order to mount an imaging hub 74 in the left hub end 57, a hub well 58 is formed by dam walls 55. The dam walls 55 are walls between inner wall 24*a* and side wall 22*a* used to form cavities 16 such as hub well 58. When hub well 58 is filled with a column of filler material 54 it forms a rigid and stable support for left hub end 57. Those skilled in the art will recognize that dam walls 55 may be used as needed to form other necessary supports in sheet metal printer frame 12. The overall structure shown in FIG. 3 is repeated in the opposite sidewall that comprises sidewall 22*b* and inner wall 24*b*.

The process of pouring the filler material 54 requires a minimum of preparation. Holes 44 in sheet metal members are sealed with tape in order to trap the filler material 54 within a cavity until hardening. Slotted junctions can also be sealed with tape as preparation for pouring. Upon hardening, a channel of the filler material 54 locks slotted junctions into place.

Castable filler material 54 is also poured into base 40, after positioning of components such as a computer slide-out tray 59 in base 40. This allows various mounting components to be embedded within the filler material 54. When the filler material 54 hardens, embedded components are locked into position. This technique could be used for parts that require precise alignment, effectively using the filler material 54 to lock components precisely into place. Tubing could also be inserted within a cavity to allow routing of wires or airflow circulation that facilitates cooling through the polymer concrete material. As shown in FIG. 3, components such as computer slide-out tray 59 can be embedded directly in filler material 54, with or without attachment hardware attaching such components to base 40. Power supply mount and vacuum support components (not shown) can also be embedded directly in castable filler material 54 when filler material 54 is poured into base 40.

Figure 4:
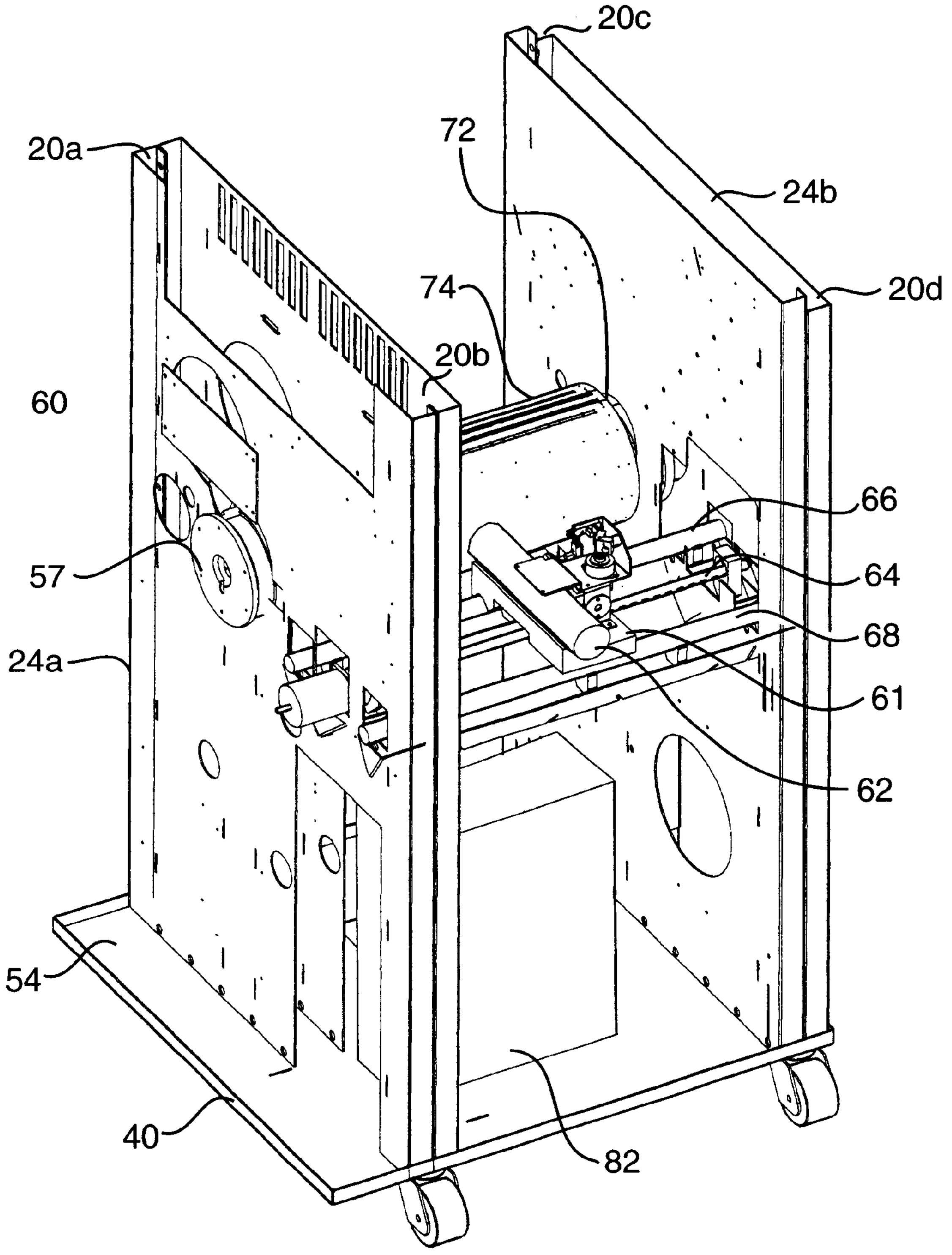
FIG. 4 is a view in perspective of the printer frame structure having a mounted imaging drum, printhead translation assembly, and associated motors and support components.

Referring to FIG. 4, therein is shown, in perspective view, a printer 60 having imaging drum 74, which would be driven by a drum motor (not shown). Imaging drum 74 is mounted to rotate within a left hub end 57 and a right hub end 72 that support imaging drum 74. Both left hub end 57 and right hub end 72 are held in place by the filler material 54 that acts as an support in hub well 58, as described above. A translation motor (not shown) drives a printhead transport 61 containing a printhead 62 by means of a lead screw 64. A front guide rail 66 and a rear guide rail 68 support printhead transport 61 over its horizontal course of travel.

Referring again to FIG. 4, it can be seen that the design of sheet metal printer frame 12, reinforced by filler material 54 as disclosed herein, allows a flexible arrangement of components for printer 60. For example, relative dimensions of side cavities 20*a*, 20*b*, 20*c*, 20*d* formed within inner walls 24*a* and 24*b* could be modified to suit the arrangement of drum motor and hub ends 57 and 72. Printer 60 could thereby be modified to optimize a writing direction, such as by reversing the path traveled by printhead transport 61. A computer 82 fits within printer 60 on computer slide-out tray 59.

Figure 5:
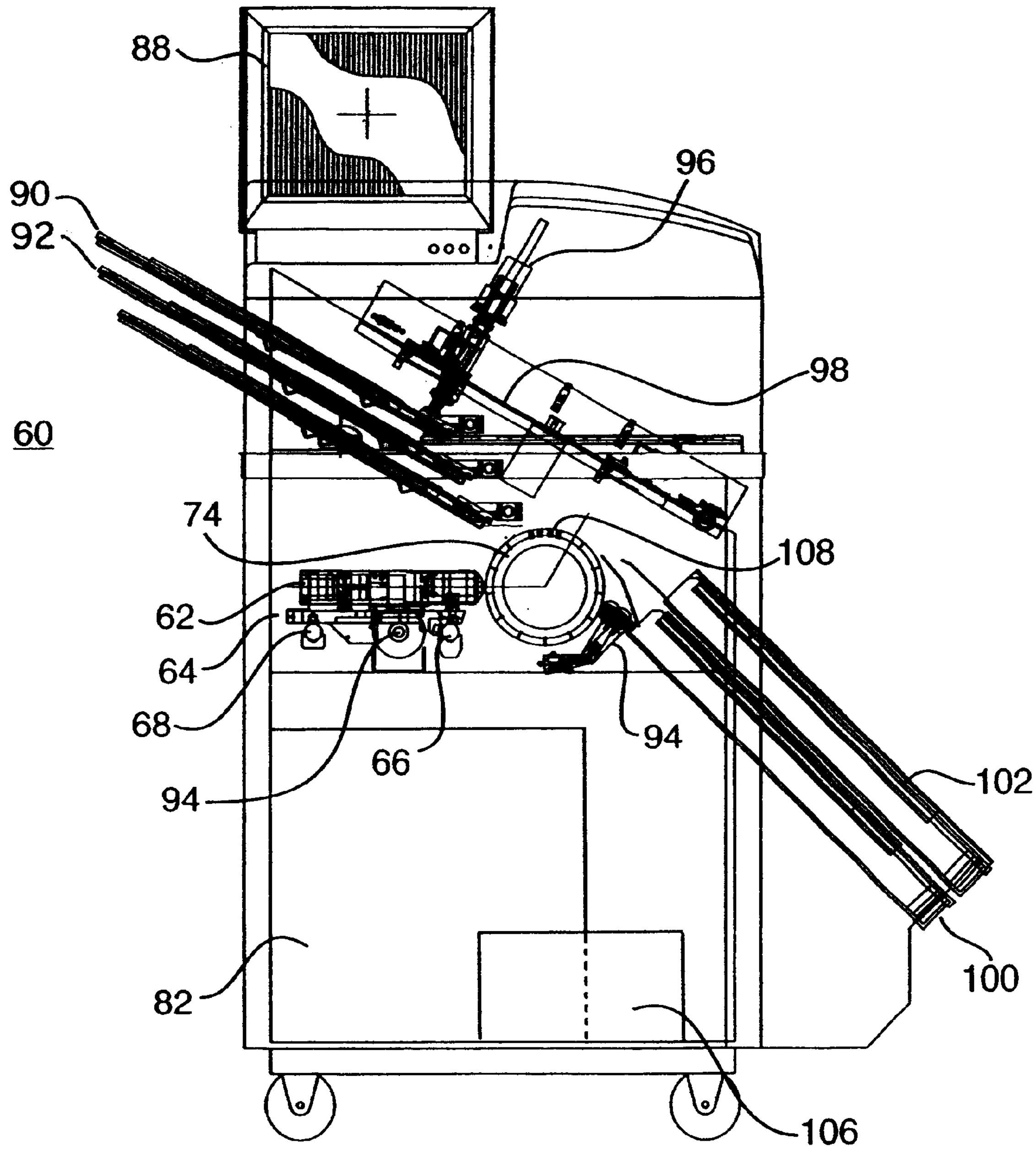
FIG. 5 is a cutaway side view showing the relative positions of key printer components within the printer frame.

FIG. 5 shows a cutaway side view of printer 60 with additional components for media handling. An intermediate supply tray 90 contains sheets of intermediate receiver media used in laser thermal imaging. At least one donor supply tray 92 holds individual sheets of thermal imaging donor material. A media picker assembly 96, moved into position by a media picker leadscrew 98, is disposed to obtain a single sheet of media at a time from supply trays 90 and 92. Media picker assembly 96 pulls a sheet of media forward from its supply tray 90 or 92 and places the sheet atop vacuum holes 108 on imaging drum 74. Imaging drum 74 then pulls the sheet further forward to engage the sheet beneath load roller 94. Load roller 94 cooperates with imaging drum 74, which rotates to roll out the media sheet and remove any air entrapped against the surface of imaging drum 74 so that the media sheet makes complete contact with the surface of imaging drum 74. This media picking process is executed to load a sheet of receiver material on imaging drum 74, then to load each successive sheet of donor material onto imaging drum 74, as is described in detail in the Harshbarger, et al. patent. Imaging takes place similar to the manner described in the Harshbarger et al. patent noted above, with printhead 62 moved parallel to the axis of imaging drum 74 as imaging drum 74 rotates at high speed.

Once imaging of a donor color is completed, media picker assembly 96 picks up the edge of the donor sheet and cooperates with drum motor 16 to rotate imaging drum 74 slightly and drop the waste donor sheet into a spent donor eject tray 100. When imaging of the intermediate receiver is completed, imaging drum 74 cooperates with media picker assembly 96 to drop the completed receiver sheet into a finished intermediate eject tray 102.

Additional components include a computer monitor 88, which is placed atop printer 60 as shown. A vacuum blower 106 is mounted in base 40. This arrangement allows filler material 54 in base 40 to provide vibration damping for vacuum blower 106 and for similar motorized equipment included within printer 60.

Figure 6:
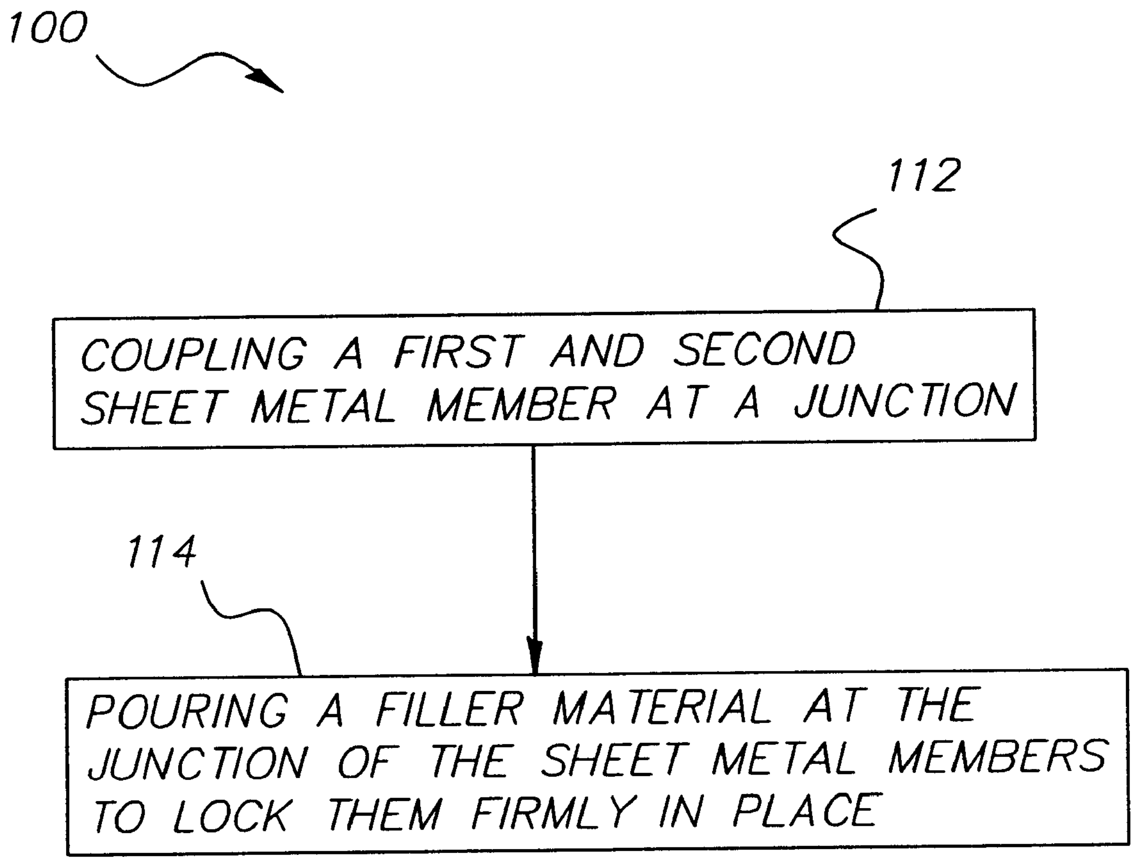
FIG. 6 is a process flow diagram illustrating the method of fabricating a print engine frame, according to one embodiment of the invention.

A method for constructing a sheet metal printer frame 12 is illustrated in FIG. 6. The method 110 begins at step 112 wherein a first sheet metal member is coupled to a second sheet metal member as herein described. The coupling may be done with tab-and-slot construction, slot-and-slot construction, magnets 56 or other similar means known to those skilled in the art. Next, in step 114, a filler material 54 is poured onto the junctions of the sheet metal members to lock the pieces firmly in place. In alternative embodiments, additional sheet metal members are coupled until the sheet metal printer frame 12 is complete prior to pouring the filler material 54 in place. The preferred filler material 54 is a castable polymer concrete.

Although the invention has been described as being sheet metal in the preferred embodiments, this is not a limit on the material for sheet metal printer frame 12. For example, sheet metal could be replaced at selective locations within the frame, such as by rigid plastic members. A variety of filler materials could be used, with formulations optimized for the specific application. This could include use of conductive filler materials for improved shielding of electromagnetic emissions. The invention could be used with a printer that uses intermediate and donor media in roll form, as is used in the printer disclosed in the Harshbarger et al. patent noted above. Therefore, what is provided is a printer frame of rigid sheet metal reinforced with a filler material and a method of assembling the printer frame.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

PARTS LIST

12 Sheet metal printer frame
14 Skeleton structure
16 Cavities
18 Troughs
20*a* Side wall
20*b* Sidewall
20*c* Side wall
20*d* Side wall
22*a* Side wall
22*b* Side wall
24*a* Inner wall
24*b* Inner wall
30*a* Full length cross-strut
30*b* Full length cross-strut
32 Right cross-strut
34 Left cross-strut
36 Tab
38 Slot
40 Base
42 Wheel
44 Holes
52 Mixer
54 Filler material
55 Dam wall
56 Magnets
57 Left hub-end
58 Hub well
59 Computer slide-out tray
60 Printer
61 Printhead transport
62 Printhead
64 Lead screw
66 Front guide rail
68 Rear guide rail
72 Right hub-end
74 Imaging drum
82 Computer
88 Computer monitor
90 Intermediate supply tray
92 Donor supply tray
94 Load roller
96 Media picker assembly
98 Media picker leadscrew
100 Spent donor eject tray
102 Finished intermediate eject tray
106 Vacuum blower
108 Vacuum hole

What is claimed is:

1. A printer frame comprising:

a skeleton structure formed of a plurality of interlocking sheet metal members so joined as to provide cavities and troughs capable of containing a solid material; and a filler material applied into said cavities and troughs formed by said interlocking sheet metal members to provide rigidity to said printer frame when said filler material has hardened.

2. The printer frame of claim 1 wherein some of said interlocking sheet metal members further comprise one or more interlocking slots.

3. The printer frame of claim 2 wherein some of said interlocking sheet metal members further comprise one or more interlocking tabs.

4. The printer frame of claim 1 wherein selected sheet metal members further comprise one or more magnets, said magnets adapted to hold said selected sheet metal members into position.

5. The printer frame of claim 1 wherein said filler material is a castable polymer concrete.

6. The printer frame of claim 1 wherein said filler material has thermal expansion properties similar to said sheet metal.

7. The printer frame of claim 1 wherein said filler material provides vibration dampening of said printer frame.

8. The printer frame of claim 1 further comprising a base capable of mounting printer support components, said base selectively filled with a filler material.

9. The printer frame of claim 1 wherein said skeleton structure further comprises a pair of hubs adapted to support an imaging drum, said hubs held in position in said printer frame by said filler material.

10. The printer frame of claim 1 further comprising a tray for mounting a computer.

11. The printer frame of claim 1 further comprising an intermediate supply tray for holding sheets of receiver media.

12. The printer frame of claim 11 further comprising a media picker assembly configured for obtaining receiver media from said intermediate supply tray.

13. The printer frame of claim 12 further comprising a leadscrew for positioning said media picker tray.

14. The printer frame of claim 13 further comprising a donor supply tray for holding individual sheets of thermal imaging donor material and providing it to said media picker tray.

15. A method for fabricating a frame for a print engine, comprising the steps of:

coupling a first sheet metal member to a second sheet metal member at a junction; and pouring a filler material at said junction to rigidly join said first and second sheet metal members.

16. The method of claim 15 wherein said filler material is a castable polymer concrete.

17. The method of claim 15 wherein the step of coupling a first sheet metal member to a second sheet metal member further comprises the step of providing magnets attached to said first sheet metal member.

18. The method of claim 15 wherein the step of coupling a first sheet metal member to a second sheet metal member is repeated until all sheet metal members in said printer frame are in place.

19. A sheet metal printer frame for supporting an imaging drum, a printhead translation assembly, and media supply components, said printer frame comprising:

a base;

two walls extending from said base, said walls having a plurality of cavities to accept a filler material and a plurality of slots to accept one or more cross struts; and a filler material filling said cavities and selectively covering said cross struts.

20. The sheet metal printer frame of claim 19 wherein said walls further comprise a side wall and a complimentary inner wall, some of said cavities formed by selected folds in said inner wall.

21. The sheet metal printer frame of claim 19 wherein each of said walls further comprises a hub well adapted to accept a column of filler material, said hub well supporting a hub mounted in each of said walls.

22. The sheet metal printer frame of claim 21 wherein said hub well further comprises one or more dam walls spanning between said side wall and said inner wall to create a form for said column of filler material.

23. The printer frame of claim 21 wherein said imaging drum is adapted to be installed between said hubs.

24. The printer frame of claim 19 wherein said filler material is a castable polymer concrete.

25. The printer frame of claim 19 wherein said filler material is selected for its vibration damping qualities.

26. The printer frame of claim 19 wherein said filler material is selected for thermal expansion qualities.

27. The printer frame of claim 19 further comprising at least two wheels attached to said base, said wheels adapted to provide mobility of said printer frame.

* * * * *